(12) United States Patent
Hazama et al.

(10) Patent No.: US 11,110,356 B2
(45) Date of Patent: Sep. 7, 2021

(54) RHYTHM GAME PROGRAM AND GAME SYSTEM

(71) Applicant: SQUARE ENIX CO., LTD., Tokyo (JP)

(72) Inventors: Ichiro Hazama, Tokyo (JP); Masanobu Suzui, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 0 days.

(21) Appl. No.: 16/830,127

(22) Filed: Mar. 25, 2020

(65) Prior Publication Data
US 2020/0306648 A1 Oct. 1, 2020

(30) Foreign Application Priority Data

Mar. 29, 2019 (JP) ............................. JP2019-065312

(51) Int. Cl.
*A63F 13/814* (2014.01)
*A63F 13/49* (2014.01)

(52) U.S. Cl.
CPC ............ *A63F 13/814* (2014.09); *A63F 13/49* (2014.09)

(58) Field of Classification Search
CPC ................................. A63F 13/814; A63F 13/44
See application file for complete search history.

(56) References Cited

U.S. PATENT DOCUMENTS

| 9,704,350 | B1 * | 7/2017 | Rigopulos ........... G07F 17/3269 |
| 2010/0009749 | A1 * | 1/2010 | Chrzanowski, Jr. .. A63F 13/428 463/35 |
| 2011/0028214 | A1 * | 2/2011 | Bright .................... G10H 1/342 463/35 |

(Continued)

FOREIGN PATENT DOCUMENTS

| JP | H11151380 A | 6/1999 |
| JP | 2001187270 A | 7/2001 |
| JP | 2001246156 A | 9/2001 |

(Continued)

OTHER PUBLICATIONS

1st Office Action for JP Application No. 2019-065312, dated Jun. 2, 2020.

(Continued)

*Primary Examiner* — James S. McClellan
(74) *Attorney, Agent, or Firm* — Dorsey & Whitney LLP

(57) ABSTRACT

A rhythm game program for causing a computer to implement a function of controlling a progress of a rhythm game by playing a music and displaying a trigger object on a display unit, the program causing the computer to implement: an evaluation function of evaluating an operation input, based on a timing of the operation input for the trigger object and an operation timing associated with data; and an object control function of moving at least one of the trigger (Continued)

object and an operation position such that a distance between the trigger object and the operation position decreases, based on the operation timing corresponding to the trigger object, wherein the object control function implements a function of causing an auxiliary object to appear when an appearance condition is satisfied, and causing the auxiliary object to execute an auxiliary operation to assist a user in a progress of a game.

10 Claims, 16 Drawing Sheets

(56) References Cited

U.S. PATENT DOCUMENTS

2011/0086705 A1* 4/2011 Chiu ............... A63F 13/814 463/35
2016/0292961 A1* 10/2016 Hamaguchi ......... G07F 17/3227

FOREIGN PATENT DOCUMENTS

| JP | 2005312758 A | 11/2005 |
| JP | 2009056053 A | 3/2009 |
| JP | 2012205684 A | 10/2012 |
| JP | 2016086983 A | 5/2016 |
| JP | 2017029867 A | 2/2017 |
| JP | 6130960 B1 | 4/2017 |
| JP | 2017113426 A | 6/2017 |
| JP | 6380644 B1 | 8/2018 |

OTHER PUBLICATIONS

Radio Hammer Station: Ride the rhythm and blow off the pervert guy! Pop and funky rhythm action, Octoba [online], Aug. 14, 2014, [Searched on Apr. 22, 2020], Internet, URL, https://octoba.net/archives/20140814-android-game-rhstation-353943.html.

Decision of Final Rejection from Japan Patent Office in Japanese Patent Appl. No. 2019-065312 dated Sep. 15, 2020.

* cited by examiner

FIG.14

MANAGEMENT TABLE E

| CHARACTER ID | CURRENT POSITION |
|---|---|
| 001 | *,*,*** |
| 002 | *,*,*** |
| – | – |
| – | – |
| – | – |
| – | – |
| – | – |
| – | – |

FIG.15

MANAGEMENT TABLE P

| CHARACTER ID | CURRENT POSITION | LANE NUMBER | HP |
|---|---|---|---|
| P001 | *,*,*** | 01 | – |
| P002 | *,*,*** | 02 | 500 |
| P003 | *,*,*** | 03 | – |
| SC01 | *,*,*** | – | – |

RHYTHM GAME PROGRAM AND GAME SYSTEM

CROSS-REFERENCE TO RELATED APPLICATION

This application claims the benefit of priority of the prior Japanese Patent Application No. 2019-065312, filed on Mar. 29, 2019, the entire contents of which are incorporated herein by reference.

BACKGROUND OF THE INVENTION

1. Field of the Invention

The present invention relates to a rhythm game program and a game system.

2. Description of Related Art

In the music game (or rhythm game) system, an indicator sign (trigger object) is moved and displayed along the corresponding track so as to reach the operation position when the operation time (timing) comes, and a process of evaluating the operation input by the player is executed (for example, see JP-A-1999-151380).

SUMMARY OF THE INVENTION

In the above-described music game system, various devices have been devised to control the indicator sign such that the game does not become monotonous, but the problem is that even a beginner can enjoy playing.

The purpose of at least one embodiment of the present invention is to solve the deficiencies in the related art.

According to a non-limited viewpoint, a rhythm game program according to an embodiment of the present invention is a rhythm game program for causing a computer to implement a function of controlling a progress of a rhythm game by playing a music and displaying a trigger object on a display unit, the program causing the computer to implement: an evaluation function of evaluating an operation input of an operation unit, based on a timing of the operation input for the trigger object and an operation timing associated with data used for playing the music; and an object control function of moving at least one of the trigger object and an operation position such that a distance between the trigger object and the operation position decreases, based on the operation timing corresponding to the trigger object, wherein the object control function implements a function of causing an auxiliary object to appear when an appearance condition is satisfied, and causing the auxiliary object to execute an auxiliary operation to assist a user in a progress of a game.

According to a non-limited viewpoint, a rhythm game program according to an embodiment of the present invention is a rhythm game program for causing a server device connected to a game terminal device which executes a rhythm game by playing a music and displaying a trigger object on a display unit by a communication network to control a progress of the rhythm game, the program causing the server device to implement: an evaluation function of evaluating an operation input of an operation unit, based on a timing of the operation input for the trigger object and an operation timing associated with data used for playing the music; and an object control function of moving at least one of the trigger object and an operation position such that a distance between the trigger object and the operation position decreases, based on the operation timing corresponding to the trigger object, wherein the object control function implements a function of causing an auxiliary object to appear when an appearance condition is satisfied, and causing the auxiliary object to execute an auxiliary operation to assist a user in a progress of a game.

According to a non-limited viewpoint, a game system according to an embodiment of the present invention is a game system including a game terminal device which executes a rhythm game by playing a music and displaying a trigger object on a display unit, and a server device which is connected to the game terminal device by a communication network, the game system realizing: an evaluation controller configured to evaluate an operation input of an operation unit, based on a timing of the operation input for the trigger object and an operation timing associated with data used for playing the music; and an object controller configured to move at least one of the trigger object and an operation position such that a distance between the trigger object and the operation position decreases, based on the operation timing corresponding to the trigger object, wherein the object controller causes an auxiliary object to appear when an appearance condition is satisfied, and causes the auxiliary object to execute an auxiliary operation to assist a user in a progress of a game.

Each embodiment of the present application solves one or more deficiencies.

BRIEF DESCRIPTION OF THE DRAWINGS

FIG. 14 is a diagram showing an example of a trigger object management table corresponding to at least one of the embodiments of the present invention.

FIG. 15 is a diagram showing an example of a party character management table corresponding to at least one of the embodiments of the present invention.

DESCRIPTION OF EMBODIMENTS

Examples of embodiments of the present invention will be described below with reference to the drawings. Various constituent elements in the examples of embodiments described below can be appropriately combined within a range in which no contradiction occurs. Further, the contents described as an example of a certain embodiment may not be described in other embodiments. Further, the contents of operations and processes not related to the characteristic part of each embodiment may be omitted. Further, the order of various processes constituting the various flows described below is in no particular order as long as no contradiction occurs in the processing contents.

First Embodiment

Figure 1:
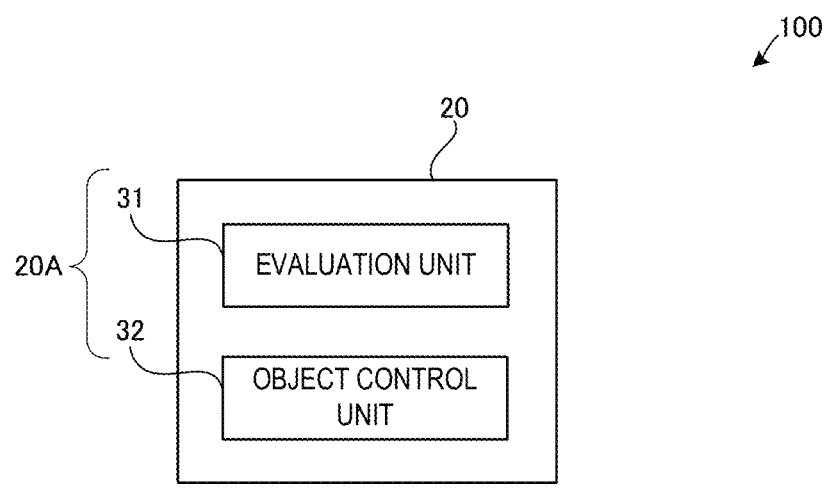
FIG. 1 is a block diagram showing a configuration example of a game system corresponding to at least one of embodiments of the present invention.

FIG. 1 is a block diagram showing a configuration example of a game system 100 corresponding to at least one of embodiments of the present invention. As shown in FIG. 1, the game system 100 includes a single terminal device (game terminal device) 20 used by a user (player) who plays a rhythm game (music video game). In FIG. 1, a configuration of a terminal device 20A that is an example of the configuration of the terminal device 20 is shown. The configuration of the game system 100 is not limited to the above configuration, and may be a configuration where the terminal device of a user is connected to the server device (video game processing server) via a communication network, and the server device provides a video game service to the terminal device (see FIG. 3).

The game system 100 has various functions for executing a video game, which is a rhythm game that plays music and displays a trigger object (indicator sign, notes) on the display unit of the terminal device 20. In the rhythm game of the example of the present embodiment, at least one of the trigger object and the operation position moves such that the distance between the trigger object and the operation position decreases. For example, the trigger object in the game space moves toward the operation position. Then, the user executes an operation input for the trigger object. Specifically, the user executes an operation input at the timing when the trigger object reaches the operation position. Evaluation is executed on this operation input. The operation is input by using the operation unit of the terminal device 20.

Further, in the rhythm game of the example of the present embodiment, an auxiliary object may also appear in the game space. The auxiliary object executes an auxiliary operation for assisting the user in the progress of the game. The auxiliary object appears when the appearance condition is satisfied. The appearance conditions include, for example, winning in a lottery. The lottery may be executed, for example, at the start of music play.

The terminal device 20 is managed by a user who plays a game. The terminal device 20 is a terminal device capable of executing a video game such as a stationary game device, a personal computer, a mobile phone terminal, a personal digital assistant (PDA), and a mobile game device.

Further, the terminal device 20 includes an operation unit, a storage unit such as a hard disk drive, a control unit configured by a CPU that generates a game image by executing the game, and a display unit that displays the game image, in order to execute the rhythm game. However, since it is a general configuration, a detailed description is omitted. In the terminal device 20, software (rhythm game program) for executing a rhythm game and controlling the progress of the game is stored in the storage unit. The rhythm game program also includes game data such as data (music data) for playing music.

Next, the configuration of the terminal device 20A that is an example of the configuration of the terminal device 20 will be described. The terminal device 20A includes at least an evaluation unit 31 and an object control unit 32 for controlling the progress of the rhythm game by the control unit executing the rhythm game program stored in the storage unit.

The evaluation unit (evaluation function) 31 evaluates the operation input, based on the operation input timing of the operation unit for the trigger object and the operation timing associated with the data (music data) used for music playback. The operation timing is, for example, information that specifies a beat of the music at which the operation is to be input. For example, game data includes timing data (for example, see FIG. 9) in which a plurality of operation timings are set.

A general configuration may be used for the evaluation method. For example, in the evaluation period, the degree of coincidence between the user's operation input and the operation timing corresponding to the evaluation period is determined. A user's operation input may be evaluated based on the degree of coincidence. The evaluation period means, for example, a predetermined period before and after one operation timing including the operation timing. That is, the evaluation is executed when the current playback position of the music overlaps a predetermined period before and after one operation timing including the operation timing.

The object control unit 32 (object control function) moves at least one of the trigger object and the operation position such that the distance between the trigger object and the operation position decreases, based on the operation timing corresponding to the trigger object. For example, the object control unit 32 causes a trigger object corresponding to an operation timing that comes after a predetermined time (for example, one measure) has elapsed from the current playback position of the music to appear at the arrangement position and move toward the operation position. In this case, the object control unit 32 moves the trigger object so as to reach the operation position, when the operation timing comes.

Further, the object control unit 32 causes the auxiliary object to appear when the appearance condition is satisfied. Then, the object control unit 32 causes the appeared auxiliary object to execute the auxiliary operation.

Next, the operation of the game system 100 (system 100) of this embodiment will be described.

Figure 2:
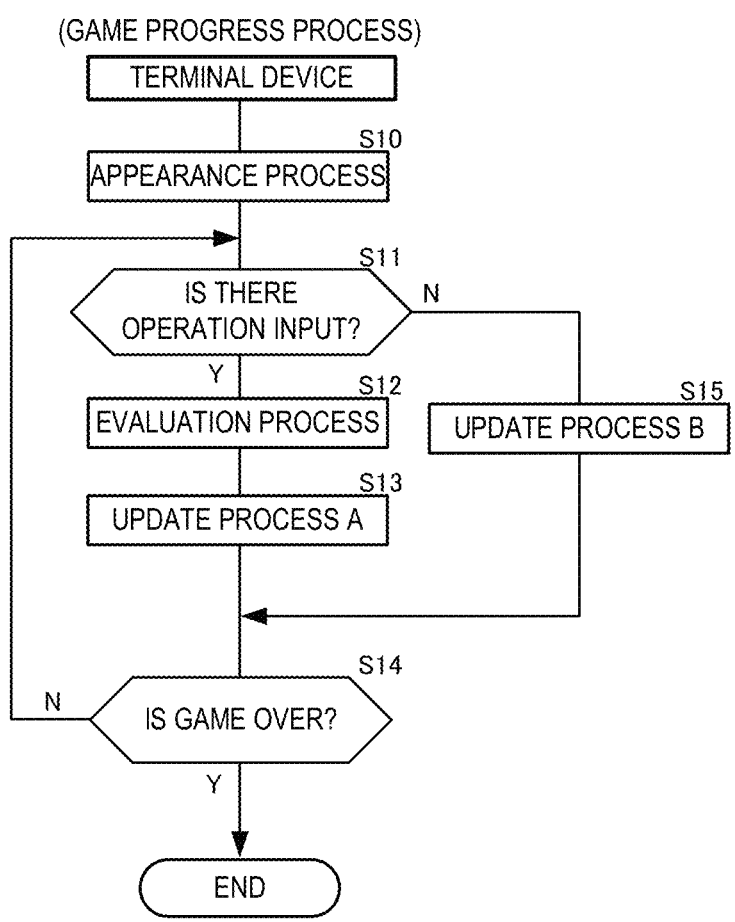
FIG. 2 is a flowchart showing an example of a game progress process corresponding to at least one of the embodiments of the present invention.

FIG. 2 is a flowchart illustrating an example of a game progress process executed by the system 100. In the game progress process, a process for progressing the game, such as a process for controlling the movement of the trigger object, an evaluation process, and a process for controlling the operation of the auxiliary object, is executed. Hereinafter, a case where the terminal device 20A executes the game progress process will be described as an example. FIG. 2 mainly shows a process for controlling the movement of the trigger object, an evaluation process, and a process for controlling the operation of the auxiliary object, and the description of the other game progress processes is partially omitted.

The game progress process of this example is executed, for example, when there is an operation input for starting a game (music playback) by the user.

Note that the terminal device 20A generates a game image including an image of the game space in which the trigger object appears, at a predetermined timing (for example, every 1/60 seconds) in accordance with the processing result of the game progress process, during the execution of the game progress process, and displays the game image on a display screen.

The terminal device 20A executes an appearance process (step S10). In the appearance process, a process for causing the auxiliary object to appear is executed. Specifically, it is determined whether the appearance condition is satisfied. When the appearance condition is satisfied, the auxiliary object appears in the game space.

Thereafter, the terminal device 20A determines whether or not there is an operation input (step S11). For example, as described above, it is determined whether or not there is an operation input in the evaluation period corresponding to one trigger object. The terminal device 20A may determine whether or not there is an operation input, based on the operation information received from the operation unit. When there is no operation input (step S11: NO), the terminal device 20A proceeds to the process of step S15.

On the other hand, when there is an operation input (step S11: YES), the terminal device 20A executes an evaluation process (step S12). In the evaluation process, for example, as described above, the user's operation input is evaluated based on the degree of coincidence between the user's operation input and the operation timing in the evaluation period, with reference to the timing data.

Next, the terminal device 20A executes an object update process A (step S13). In the update process A, the terminal device 20A updates the operation of the object in the game space. For example, the terminal device 20A causes the trigger object to appear at the arrangement position, based on each operation timing, and to move toward the operation position. Specifically, the terminal device 20A moves the trigger object from the arrangement position at a constant speed so as to reach the operation position when the operation timing comes. In addition, the terminal device 20A controls the operation of the auxiliary object appearing in the game space. Thereafter, the terminal device 20A proceeds to the process of step S14.

Returning to the process of step S11, when it is determined that there is no operation input, the terminal device 20A executes an object update process B (step S15). In the update process B, the same process as the above-described update process A is executed, but the process related to the one trigger object that has received the operation input as in the update process A is not executed. For example, in the update process B, a process of causing the trigger object for which the evaluation period has elapsed without any operation input to disappear from the game space is executed. In addition, the terminal device 20A controls the operation of the auxiliary object appearing in the game space. In the update process B, the terminal device 20A causes the auxiliary object to execute the above-described auxiliary operation.

Thereafter, the terminal device 20A determines whether or not the game is over (step S14). For example, the terminal device 20A may determine that the game is over when the playback of the music is ended. When the game is not over (step S14: NO), the terminal device 20A returns to the process of step S11. On the other hand, when the game is over (step S14: YES), the terminal device 20A ends the game progress process.

As described above, as one aspect of the first embodiment, since the terminal device 20A is configured to include the evaluation unit 31 and the object control unit 32, an auxiliary object executing an auxiliary operation appears when the appearance condition is satisfied. Therefore, even a user such as a beginner with a low level of game skill can enjoy playing.

Figure 3:
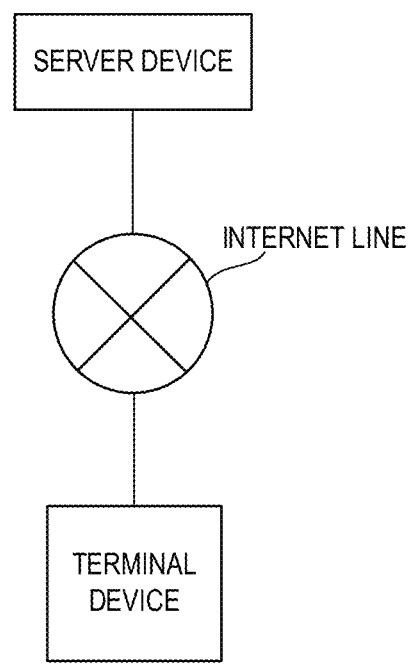
FIG. 3 is a block diagram showing a configuration example of a game system corresponding to at least one of embodiments of the present invention.

In the example of the first embodiment described above, the terminal device 20A executes the game program to control the progress of the game, but the configuration is not particularly limited thereto. For example, a game system including a server device and a terminal device as shown in FIG. 3 may be used, and the server device may include at least the evaluation unit 31 and the object control unit 32 instead of the terminal device 20A.

The server device includes a storage unit such as a hard disk drive (not shown), a control unit configured with a CPU, and the like. Further, the server device controls the progress of the video game in the same manner as the terminal device 20A, by the control unit executing the above-described game program stored in the storage unit. The server device includes a general configuration for controlling the progress of the video game, such as a control unit and a communication unit, but a detailed description thereof is omitted here.

The server device does not execute a video game as the terminal device 20A. The server device includes, for example, a communication unit connected to the Internet line (communication network), and communicates with a terminal device that executes a video game. The server device receives an operation signal (operation information) or the like from the user (terminal device), and transmits information (image information or the like) related to the game progress to the terminal device. A plurality of server devices may cooperate to execute the game program, and the server device and terminal device may cooperate to execute the rhythm game program (control the progress of the game).

Figure 4:
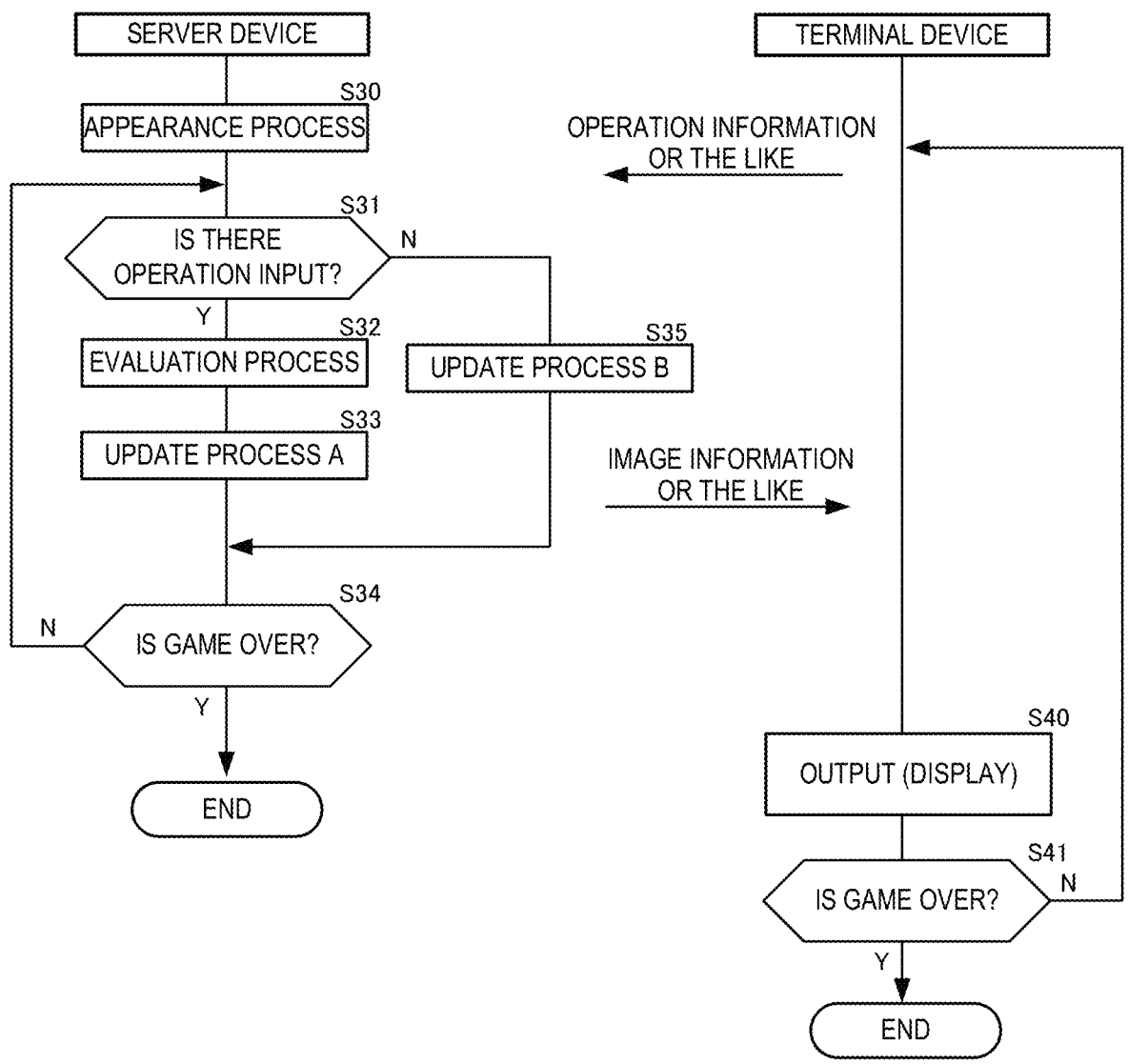
FIG. 4 is a flowchart showing an example of operations of a server device and a terminal device when the server device corresponding to at least one of the embodiments of the present invention executes a game progress process.

FIG. 4 is a flowchart showing an example of operations of a server device and a terminal device when the server device executes the game progress process shown in FIG. 2.

The terminal device periodically transmits the operation information of the operation unit by the user together with the user identification information. The server device executes each process for each user (identification information).

The server device executes an appearance process (step S30). In the appearance process, a process for causing the auxiliary object to appear is executed.

Thereafter, the server device determines whether or not there is an operation input (step S31). For example, as described above, it is determined whether or not there is an operation input in the evaluation period corresponding to one trigger object. The server device may determine whether or not there is a request for operation input, based on the received operation information. When there is no operation input (step S31: NO), the server device proceeds to the process of step S35.

On the other hand, when there is an operation input (step S31: YES), the server device executes an evaluation process (step S32). Next, the server device executes the object update process A (step S33). In the update process A, the server device updates the operation of the object in the game space. In addition, the server device controls the operation of the auxiliary object appearing in the game space. Thereafter, the server device proceeds to the process of step S34.

Returning to the process of step S31, when it is determined that there is no operation input, the server device executes the object update process B (step S35). In the update process B, the same process as the above-described update process A is executed, but the process related to the one trigger object that has received the operation input as in the update process A is not executed.

Thereafter, the server device determines whether or not the game is over (step S34). When the game is not over (step S34: NO), the server device returns to the process of step S31. On the other hand, when the game is over (step S34: YES), the server device ends the game progress process.

Further, the server device periodically transmits image information and the like for generating a game image corresponding to the game progress in the game progress process to the terminal device. Until the game ends (step S41: YES), the terminal device outputs (displays on the display unit) a game image based on the received image information (step S40).

Note that the above-described "trigger object" means an object that notifies the user of operation timing when the user inputs an operation. Any configuration can be adopted as the form of the trigger object. For example, there are disks, rings, characters, items, and the like. There may be a plurality of types of trigger objects.

The "operation position" described above is a position where an operation input is made for the trigger object. The operation position may not be displayed on the display unit. In the case of hiding, for example, a guide marker (see FIGS. 12A to 12D) for notifying that the trigger object is approaching the operation position may be displayed. The operation position may be provided separately for each trigger object.

The above-described "operation unit" may employ an operation unit of any configuration as long as the user can operate it. Examples of the operation unit include a game controller (game pad) provided with a plurality of buttons (operators), a touch panel disposed on a display screen, and the like.

The above-described "auxiliary object" means an object that executes an auxiliary operation to assist the user in the progress of the game. Any configuration can be adopted as the form of the auxiliary object. Examples thereof are characters. Further, there may be a plurality of types of auxiliary objects. Then, the plurality of types of auxiliary objects may execute different auxiliary operations.

The above-described "auxiliary operation" may be any operation as long as the operation assists the user in the progress of the game. "Auxiliary" means supplementing and helping the user in the disadvantageous progress of the game. For example, a case will be described in which a parameter of vitality (HP) is set for a user (or a user's operation character). With respect to the vitality, an initial value is set, and when no operation input is executed for the trigger object, the vitality is decreased by a predetermined value. Then, when the current value of the vitality becomes 0, the game ends even during the playback of the music.

In the above-described example, the operation to reduce the amount by which the current value of the vitality is decreased corresponds to the auxiliary operation. Specifically, there is an operation for avoiding a decrease in the current value of the vitality, when an operation input for the trigger object is not executed. In this case, for example, the above-described auxiliary operation may be executed in the update process B of step S15.

Further, an operation to recover (increase) the current value of the vitality also corresponds to the auxiliary operation. In this case, for example, the above-described auxiliary operation may be executed in the update processes A and B of steps S13 and S15.

Further, in the above-described example, when the vitality reaches 0 and the game play ends, the operation to restart (continue) the game play also corresponds to the auxiliary operation. In this case, for example, at step S14, after it is determined that the game play ends with the vitality of 0, the auxiliary operation may be executed, and the process may return to step S11. Note that a plurality of auxiliary operations may not be executed, and the auxiliary object may be caused to execute at least one auxiliary operation.

In the example of the above-described embodiment, the auxiliary operation does not have an activation condition, but the activation condition may be set thereto. The activation condition is, for example, that a lottery with a predetermined probability has been won. Thereby, excessive assistance to the user can be suppressed.

In the example of the above-described embodiment, the configuration in which the trigger object is moved toward the operation position is illustrated, but the configuration is not particularly limited thereto. The operation position may move toward the trigger object. Alternatively, the trigger object and the operation position may move with respect to each other.

The movement of the trigger object and the operation position in the example of the above-described embodiment may be executed along the movement path, for example. In this case, the movement path may be a fixed route connecting the trigger object and the operation position, or may be a randomly formed route connecting the trigger object and the operation position.

In the example of the above-described embodiment, the appearance condition is determined only once immediately after the start of the game (music playback), but the present invention is not particularly limited to this. For example, the determination may be made periodically every time a predetermined time elapses during the playback of the music.

In the example of the above-described embodiment, when the appearance condition is satisfied, the auxiliary object continuously appears in the game space, but the present invention is not particularly limited to this. For example, a disappearance condition may be provided. The disappearance condition is, for example, that a lottery (an extinction lottery) with a predetermined probability is won. Alternatively, the disappearance condition may be that the number of times of execution of the auxiliary operation has reached a predetermined number. Further, for example, a condition regarding evaluation of a user's operation input may be used as the disappearance condition. Specifically, the user's operation input has obtained evaluations equal to or more than a constant level consecutively a predetermined number of times or more.

In the example of the above-described embodiment, in the update process A, the auxiliary object does not execute the auxiliary operation, but may execute the auxiliary operation.

Second Embodiment

Figure 5:
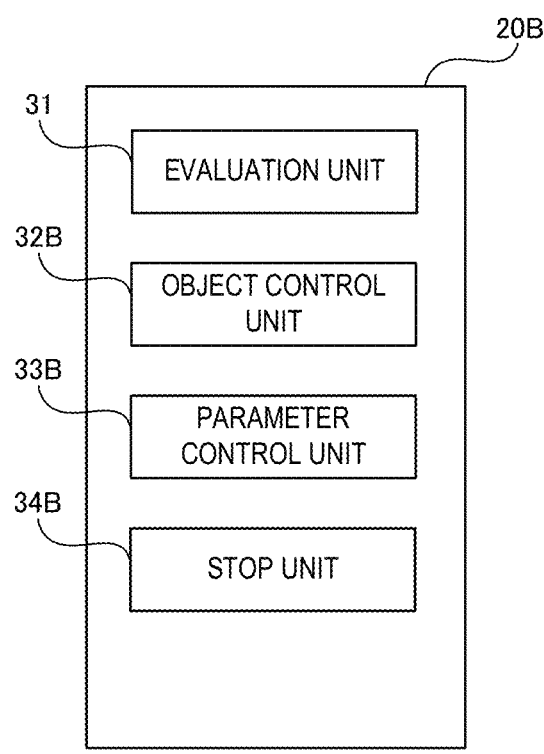
FIG. 5 is a block diagram showing a configuration of a terminal device corresponding to at least one of embodiments of the present invention.

FIG. 5 is a block diagram illustrating a configuration of a terminal device 20B that is an example of the terminal device 20. In the example of the present embodiment, the terminal device 20B includes at least an evaluation unit 31, an object control unit 32B, a parameter control unit 33B, and a stop unit 34B.

In the rhythm game of an example of the present embodiment, a predetermined parameter is set. The predetermined parameter decreases or increases by a predetermined value at least when the user does not input an operation for the trigger object. When the value of the predetermined parameter reaches the limit value, the playback of the music is interrupted, and the progress of the game is stopped.

The predetermined parameter is numerical information, and corresponds to, for example, a parameter of the vitality (HP) of the user (or the user's operation character). With respect to the vitality, an initial value is set, and when no operation input is executed for the trigger object, the vitality is decreased by a predetermined value. Then, when the current value of the vitality becomes 0 (limit value), the game ends even during the playback of the music. Further, for example, the parameter of the cumulative damage of the user (or the user's operation character) may be set as the predetermined parameter. The cumulative damage is set to 0 as an initial value, and when an operation input is not executed for the trigger object, the cumulative damage is added by a predetermined value. Then, when the current value of the cumulative damage reaches 100 (limit value), the game ends even during the playback of the music.

The evaluation unit 31 evaluates the operation input, based on the operation input timing of the operation unit for the trigger object and the operation timing associated with the data (music data) used for music playback.

The object control unit 32B moves at least one of the trigger object and the operation position such that the distance between the trigger object and the operation position decreases, based on the operation timing corresponding to the trigger object.

Further, the object control unit 32B causes the auxiliary object to appear when the appearance condition is satisfied. Then, the object control unit 32B causes the appeared auxiliary object to execute the auxiliary operation.

The object control unit 32B, as an auxiliary operation, causes the auxiliary object to execute at least one of an operation of reducing the amount by which the value (current value) of the predetermined parameter is decreased or increased (first auxiliary operation), an operation of recovering the value of the predetermined parameter (second auxiliary operation), and an operation of restarting the progress of the stopped game (third auxiliary operation). In the example of the present embodiment, a case where the above-described three auxiliary operations are executed will be described.

An example of each auxiliary operation when the predetermined parameter is the vitality described above will be described. As a first auxiliary operation, there is an operation for avoiding a decrease in the current value of the vitality when an operation input for the trigger object is not executed. As a second auxiliary operation, there is an operation of recovering (increasing) the decreased current value of the vitality. As a third auxiliary operation, there is an operation to restart (continue) the game play when the vitality reaches 0 and the game play ends.

The parameter control unit (parameter control function) 33B decreases or increases the value (current value) of a predetermined parameter by a predetermined value, at least when an operation input for the trigger object is not executed. For example, when the evaluation period corresponding to one trigger object has elapsed without any operation input, it may be determined that the operation input for this trigger object has not been executed. When the value of the predetermined parameter reaches the limit value, the stop unit (stop function) 34B interrupts the playback of the music, and stops the progress of the game.

The predetermined value by which the value of the predetermined parameter is decreased or increased and the limit value of the value of the predetermined parameter may be included in the game data.

Next, the operation of the game system 100 (system 100) of this embodiment will be described.

Figure 6:
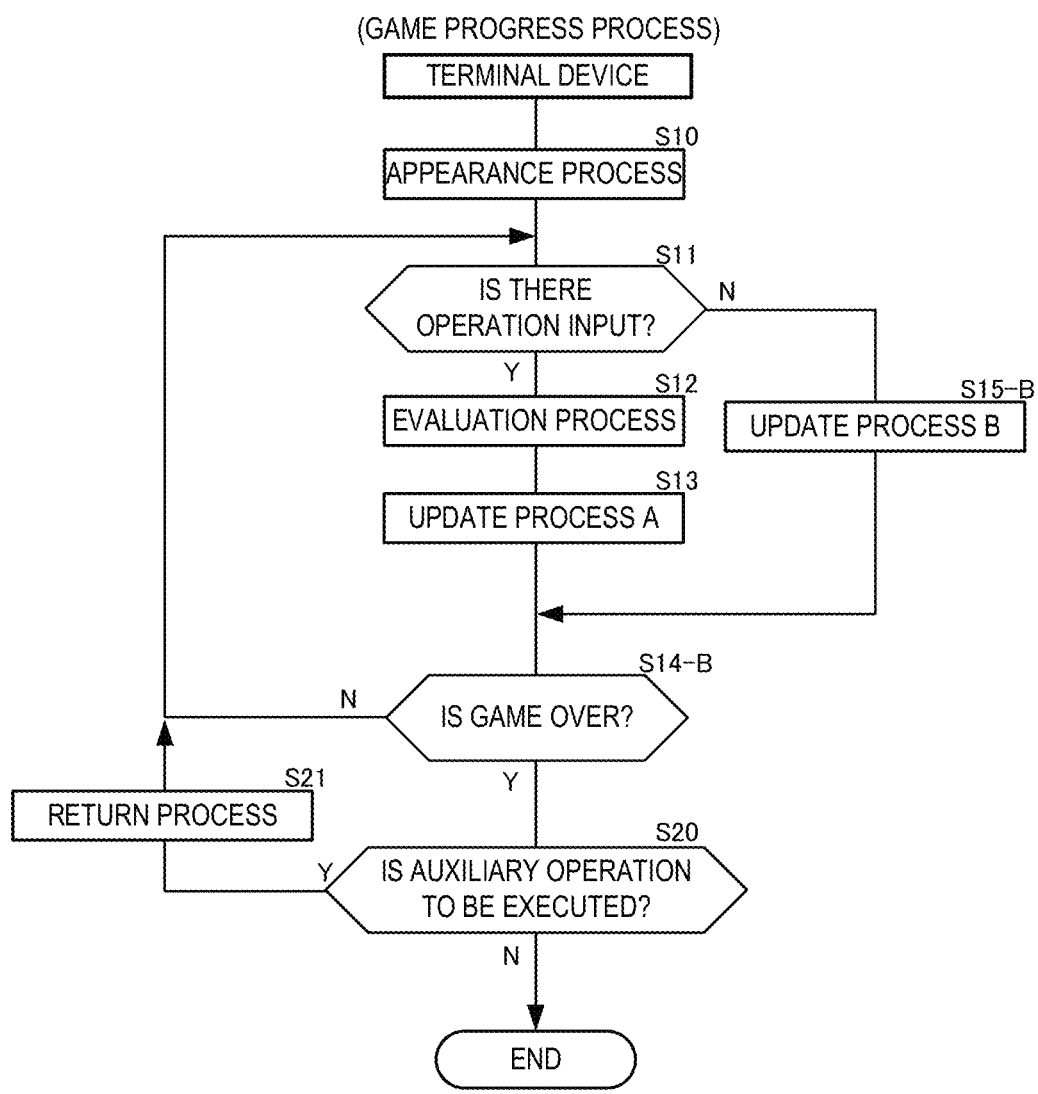
FIG. 6 is a flowchart showing an example of a game progress process corresponding to at least one of the embodiments of the present invention.

FIG. 6 is a flowchart illustrating an example of a game progress process executed by the system 100. In the game progress process, a process for progressing the game, such as a process for controlling the movement of the trigger object, an evaluation process, and a process for controlling the operation of the auxiliary object, is executed. Hereinafter, a case where the terminal device 20B executes the game progress process will be described as an example. FIG. 6 mainly shows a process for controlling the movement of the trigger object, an evaluation process, and a process for controlling the operation of the auxiliary object, and the description of the other game progress processes is partially omitted. The flowchart showing the operation of the server device is omitted from the viewpoint of avoiding redundant explanation.

The game progress process of the example of the present embodiment is executed, for example, when there is an operation input for starting a game (music playback) by the user.

Note that the terminal device 20B generates a game image including an image of the game space in which the trigger object appears, at a predetermined timing (for example, every 1/60 seconds) in accordance with the processing result of the game progress process, during the execution of the game progress process, and displays the game image on a display screen.

The terminal device 20B executes an appearance process (step S10). In the appearance process, a process for causing the auxiliary object to appear is executed. Specifically, it is determined whether the appearance condition is satisfied. When the appearance condition is satisfied, the auxiliary object appears in the game space.

Thereafter, the terminal device 20B determines whether or not there is an operation input (step S11). For example, as described above, it is determined whether or not there is an operation input in the evaluation period corresponding to one trigger object. The terminal device 20B may determine whether or not there is an operation input, based on the operation information received from the operation unit. When there is no operation input (step S11: NO), the terminal device 20B proceeds to the process of step S15-B.

On the other hand, when there is an operation input (step S11: YES), the terminal device 20B executes an evaluation process (step S12). In the evaluation process, for example, as described above, the user's operation input is evaluated based on the degree of coincidence between the user's operation input and the operation timing in the evaluation period, with reference to the timing data.

Next, the terminal device 20B executes the object update process A (step S13). In the update process A, the terminal device 20B updates the operation of the object in the game space. For example, the terminal device 20B causes the trigger object to appear at the arrangement position, based on each operation timing, and to move toward the operation position. Specifically, the terminal device 20B moves the trigger object from the arrangement position at a constant speed so as to reach the operation position when the operation timing comes. In addition, the terminal device 20B controls the operation of the auxiliary object appearing in the game space. Thereafter, the terminal device 20B proceeds to the process of step S14-B.

Returning to the process of step S11, when it is determined that there is no operation input, the terminal device 20B executes the object update process B (step S15-B). In the update process B, the same process as the above-described update process A is executed, but the process related to the one trigger object for which the operation input has been executed as in the update process A is not executed. For example, in the update process B, a process of causing the trigger object for which the evaluation period has elapsed without any operation input to disappear from the game space, and decreasing or increasing the value of the above-described predetermined parameter by a predetermined value is executed.

In addition, the terminal device 20B controls the operation of the auxiliary object appearing in the game space. In the update process B, the terminal device 20B causes the first auxiliary operation and the second auxiliary operation described above to be executed, for example. The first auxiliary operation may be executed when the value of the predetermined parameter decreases by a predetermined value. Further, the second auxiliary operation may be executed, when the value of the predetermined parameter fluctuates from the initial value. The second auxiliary operation may recover the value by a predetermined recovery value, for example.

Thereafter, the terminal device 20B determines whether or not the game is over (step S14-B). For example, the terminal device 20B may determine that the game is over when the playback of the music is ended. Further, the terminal device 20B may determine that the game is over even when the value of the predetermined parameter has reached the limit value. When the game is not over (step S14-B: NO), the terminal device 20B returns to the process of step S11.

On the other hand, when the game is over (step S14-B: YES), the terminal device 20B determines whether or not to execute an auxiliary operation to restart the progress of the above-described game (step S20). For example, when the value of the predetermined parameter has reached the limit value, the game play ends, and the auxiliary object appears, the terminal device 20B may determine to execute the auxiliary operation. When it is determined that the auxiliary operation is not to be executed (step S20: NO), the terminal device 20B ends the game progress process.

On the other hand, when it is determined that the auxiliary operation is to be executed (step S20: YES), the terminal device 20B executes a return process (step S20). In the return process, the auxiliary object is caused to execute an auxiliary operation to restart the progress of the game. Thereafter, the terminal device 20B proceeds to the process of step S11.

As described above, as one aspect of the second embodiment, since the terminal device 20B is configured to include the evaluation unit 31, the object control unit 32B, the parameter control unit 33B, and the stop unit 34B, when the appearance condition is satisfied, an auxiliary object executing an auxiliary operation appears. Therefore, even a user such as a beginner with a low level of game skill can enjoy playing.

In the example of the above-described embodiment, a case has been described in which all three auxiliary operations are executed. However, a configuration in which at least one auxiliary operation is executed may be used.

In the example of the above-described embodiment, the activation condition is not set for the auxiliary operation, but the activation condition may be set. The activation condition is, for example, that a lottery with a predetermined probability has been won. Thereby, excessive assistance to the user can be suppressed.

In the example of the above-described embodiment, the configuration in which the trigger object is moved toward the operation position is illustrated, but the configuration is not particularly limited thereto. The operation position may move toward the trigger object. Alternatively, the trigger object and the operation position may move with respect to each other.

The movement of the trigger object and the operation position in the example of the above-described embodiment may be executed along the movement path, for example. In this case, the movement path may be a fixed route connecting the trigger object and the operation position, or may be a randomly formed route connecting the trigger object and the operation position.

In the example of the above-described embodiment, the appearance condition is determined only once immediately after the start of the game (music playback), but the present invention is not particularly limited to this. For example, the determination may be made periodically every time a predetermined time elapses during the playback of the music.

In the example of the above-described embodiment, when the appearance condition is satisfied, the auxiliary object continuously appears in the game space, but the present invention is not particularly limited to this. For example, a disappearance condition may be provided. The disappearance condition is, for example, that a lottery (an extinction lottery) with a predetermined probability is won. Alternatively, the disappearance condition may be that the number of times of execution of the auxiliary operation has reached a predetermined number. Further, for example, a condition regarding evaluation of a user's operation input may be used as the disappearance condition. Specifically, the user's operation input has obtained evaluations equal to or more than a constant level consecutively a predetermined number of times or more.

In the example of the above-described embodiment, in the update process A, the auxiliary object does not execute the auxiliary operation, but the auxiliary object may execute the auxiliary operation. For example, when even the trigger object for which an operation input is executed is evaluated as low, and a configuration that decreases or increases a predetermined parameter is applied, the above-described auxiliary operation may be executed also in the update process A. In the update process A, a second auxiliary operation may be executed.

Third Embodiment

Figure 7:
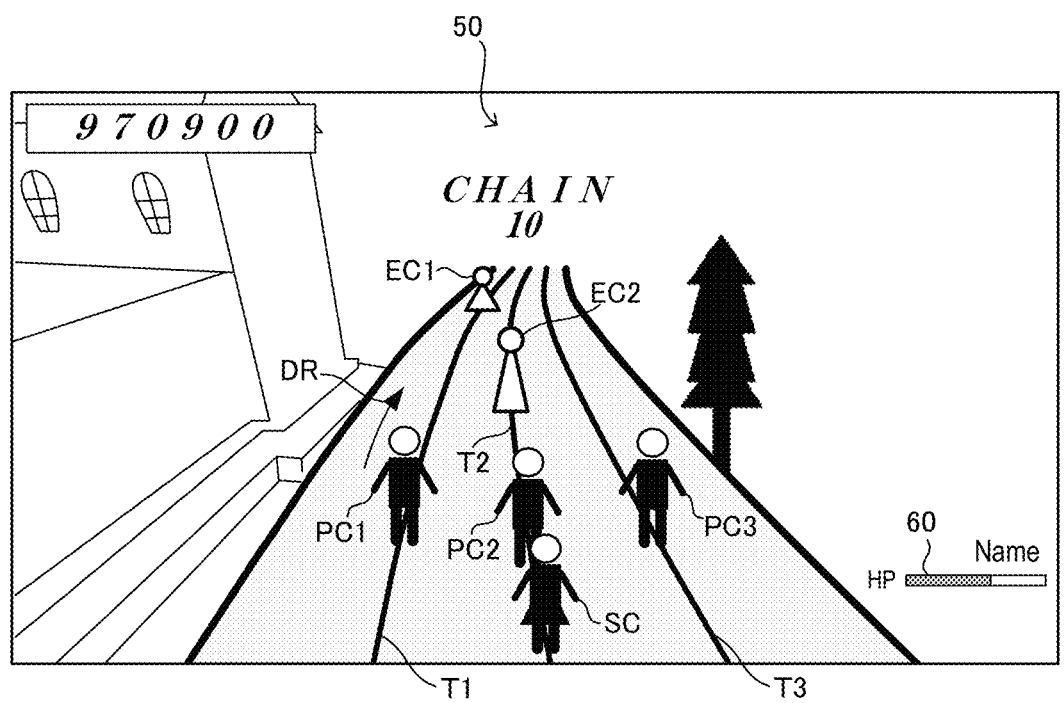
FIG. 7 is a diagram showing an example of a game image corresponding to at least one of the embodiments of the present invention.

FIG. 7 is a diagram illustrating an example of the game image according to an example of the present embodiment. The terminal device 20C of the example of the present embodiment is a stationary game device having a communication function for communicating with other terminal devices via a communication network such as the Internet.

The terminal device 20C includes an operation unit (not shown) that is a game controller (game pad) having a plurality of buttons (operators). Further, the terminal device 20C includes a display unit that is a liquid crystal display device.

The terminal device 20C executes the rhythm game program stored in the storage unit to display a game image as shown in FIG. 7 on the display unit (display screen) and provide the user with a rhythm game (game). The game image includes an image of the game space 50 imaged from the back side of the three party characters PC (PC1 to PC3) that are users' companions. The game space 50 is a three-dimensional virtual space. In the game space 50, enemy characters ECs (EC1, EC2), which are trigger objects, also appear as the music playback progresses. The enemy character EC notifies of the timing when the user presses the button of the game controller.

In the game of the example of the present embodiment, the user executes an operation input for a trigger object such as the enemy character EC, and evaluation ("EXCELLENT", "GOOD", "MISS", or the like) is executed for the operation input. Further, the party character PC attacks the enemy character EC in response to the operation input. In the example of the present embodiment, the party character PC attacks the enemy character EC only when the evaluation of the operation input is "EXCELLENT" or "GOOD". The enemy character EC becomes unable to fight by one attack and disappears. The party character PC corresponds to an operation character.

In addition, the enemy character EC attacks the party character PC when the user does not execute an operation input or when the evaluation of the operation input is "MISS". That is, when the enemy character EC is not attacked by the party character PC, the enemy character EC attacks the party character PC. When the party characters PC1 to PC3 are attacked by the enemy character EC, the current value of the vitality (HP) decreases by a predetermined value.

The vitality is the vitality of the party character PC2 as the main character among the three party characters PC1 to PC3. That is, when any of the three party characters PC1 to PC3 is attacked, the current value of the vitality of the party character PC2 decreases. At the start of the game, the maximum value of the vitality of the party character PC2 is set as the initial value of the vitality of the party character PC2. The maximum value of the vitality of the party character PC2 is included in the game data. The current value of the vitality is displayed on the game image as an image of the HP gauge 60. When the current value of the vitality becomes 0 (limit value), the party character PC2 becomes unable to fight, and the game ends even while the music is played.

In the example of the present embodiment, an auxiliary character (auxiliary object) SC may appear. FIG. 7 shows a state where the auxiliary character SC appears. The auxiliary character SC is located behind the party character PC2, and executes an auxiliary operation following the movement of the party character PC. Details will be described later.

In the game space 50, there are movement paths T (T1 to T3) of the party characters PC1 to PC3. As the music playback progresses, the party characters PC1 to PC3 respectively move on the movement paths T1 to T3 at the same constant speed. The moving direction DR of each of the party characters PC1 to PC3 is a direction from the front to the back of the game space 50 illustrated in FIG. 7. The enemy characters ECs (EC1, EC2) appear on the movement paths T1 to T3.

In the example of the present embodiment, an operation input for the enemy character EC on the movement paths T1 and T3 is made by the same button A (not shown) provided on the game controller. Further, an operation input for the enemy character EC on the movement path T2 is made by a button B (not shown) different from the button A.

Figure 8A:
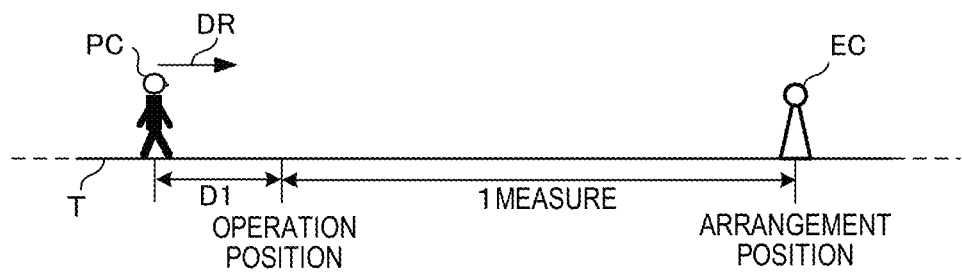
FIGS. 8A and 8B are diagrams showing a game space corresponding to at least one of the embodiments of the present invention.
Figure 8B:
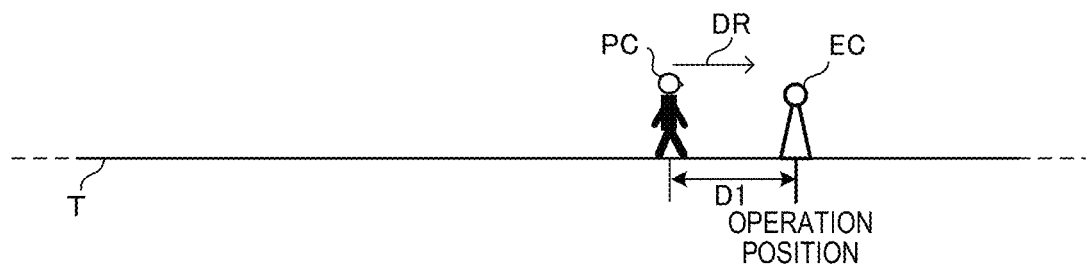

FIGS. 8A and 8B are diagrams showing the relationship among the party character PC, the enemy character EC, and the operation position. FIG. 8A shows a state in which the enemy character EC is disposed at the arrangement position. In the example of the present embodiment, the operation position is set at a position away from the party character PC to the front by a predetermined distance D1. Then, as the music playback progresses, the party character PC moves along the movement path T in the movement direction DR. Thereby, the party character PC approaches the enemy character EC. Further, the operation position also moves as the party character PC moves. That is, as the music playback progresses, the distance between the enemy character EC and the operation position decreases. Finally, as shown in FIG. 8B, the timing at which the position of the enemy character EC overlaps with the operation position is the operation timing at which the user is to input the operation.

The enemy character EC is disposed at the arrangement position, based on the corresponding operation timing. Specifically, the enemy character EC corresponding to the operation timing that comes when one measure has elapsed from the current playback position of the music is disposed at the arrangement position. As shown in FIG. 8A, as the arrangement position, a position which overlaps the operation position when one measure has elapsed is calculated. The disposed enemy character EC does not move by itself. That is, in the example of the present embodiment, the distance between the trigger object (enemy character EC) and the operation position is decreased by moving the operation position. The arrangement position and arrangement timing of the enemy character EC are not limited to the above-described one measure, and any position and timing may be adopted.

Figure 9:
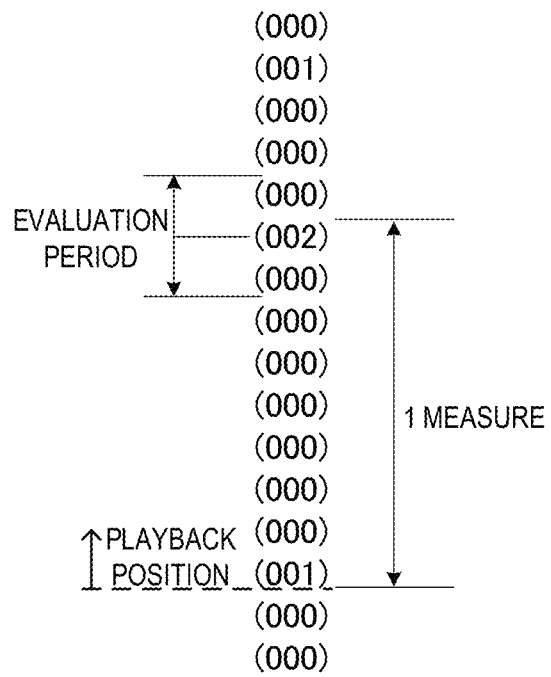
FIG. 9 is a diagram showing an example of timing data corresponding to at least one of the embodiments of the present invention.

The operation timings are set in timing data as shown in FIG. 9. FIG. 9 is a diagram showing an example of timing data. In the timing data, a plurality of operation timings are set in one row in order of time series from the start of music playback. The timing data shown in FIG. 9 is timing data for the movement path T2. In the timing data, for example, the operation timing is set in units of ⅛ measure. Then, at least the enemy characters EC corresponding to the operation timings for one measure from the current playback position is disposed in the game space 50. That is, the enemy characters EC at the operation timings of eight lines (one measure) upward from the current playback position is disposed on the movement path T2 in order of time series from the operation position. As the music playback (playback position) progresses, the range of one measure gradually changes and new enemy characters EC appear in the game space 50.

Figure 10A:
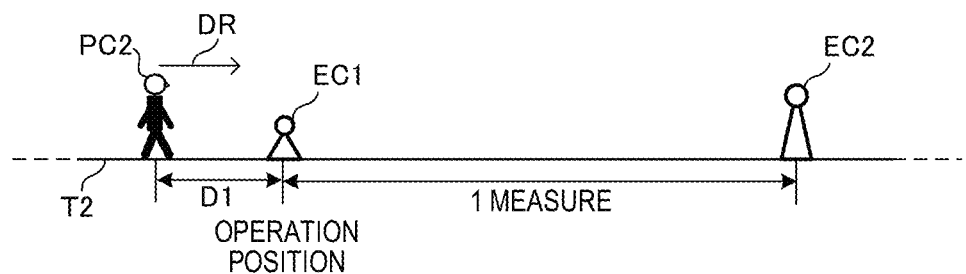
FIGS. 10A, 10B, and 10C are diagrams showing an example of a game space corresponding to at least one of the embodiments of the present invention.

For example, in the game space 50 shown in FIG. 10A, the enemy characters EC1 and EC2 corresponding to the operation timings for one measure from the current playback position shown in FIG. 9 are disposed. FIG. 10A shows a state immediately after the enemy character EC2 is disposed.

In the timing data, for example, character ID is set as operation timing information. The character ID is identification information that specifies the type of the enemy character EC, and is 3-digit numerical information. The character ID: 001 is identification information of the enemy character EC1. The character ID: 002 is identification information of the enemy character EC2. The character ID: 000 indicates that the operation timing is not set.

For example, the operation timing (001) at the playback position in FIG. 9 is the operation timing corresponding to the enemy character EC1 shown in FIG. 10A. The operation timing (002) shown in FIG. 9 is the operation timing corresponding to the enemy character EC2 shown in FIG. 10A. In the example of the present embodiment, as shown in FIG. 9, the operation timing overlapping with the playback position indicates the timing at which the user is to input the operation at present. That is, the playback position corresponds to the operation position of the game space 50. Therefore, the enemy character EC at the operation timing overlapping the playback position overlaps the operation position. For example, as shown in FIG. 10A, the enemy character EC1 at the operation timing (001) that overlaps the playback position in FIG. 9 overlaps the operation position.

Further, as shown in FIG. 9, a predetermined period before and after each operation timing set in the timing data is an evaluation period. For example, in FIG. 9, the operation timing (002) is not an evaluation target because the current playback position does not belong to the evaluation period. Note that the data including the character ID: 000 is not an evaluation target because the operation timing is not set.

Figure 11A:
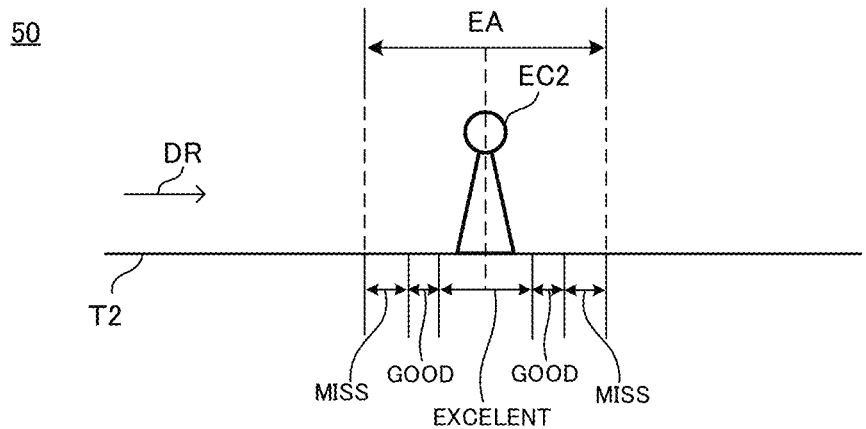
FIGS. 11A, 11B and 11C are diagrams showing an example of a game space corresponding to at least one of the embodiments of the present invention.
Figure 11B:
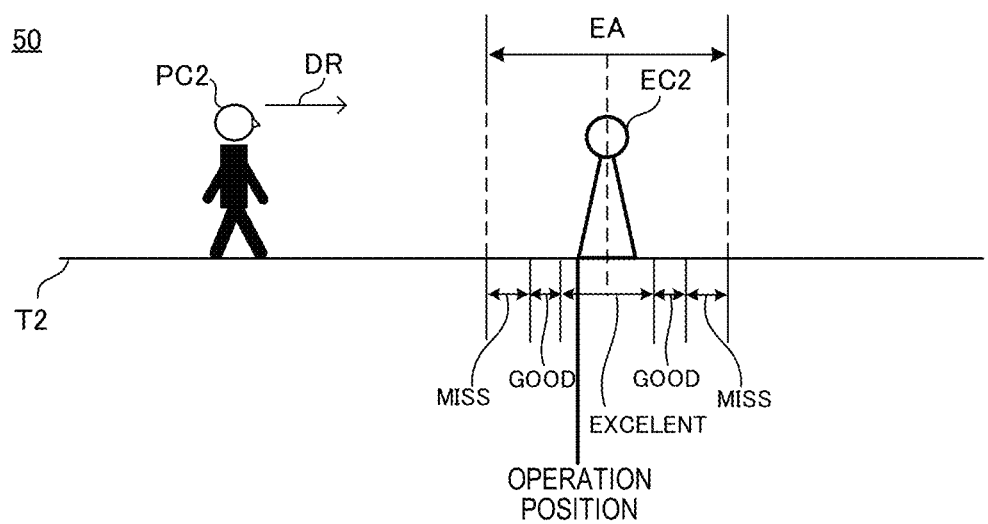

That is, the evaluation period is the evaluation range EA illustrated in FIG. 11A. FIG. 11A shows an example of the evaluation range EA of the enemy character EC2. Then, at the timing when the user executes the operation input, the evaluation is determined depending on which range of the "EXCELLENT", "GOOD", and "MISS" in the evaluation range EA the operation position belongs to. For example, as shown in FIG. 11B, when an operation input is executed in a state where the operation position belongs to the range of "EXCELLENT" in the evaluation range EA, this operation input is evaluated as "EXCELLENT".

Figure 10B:
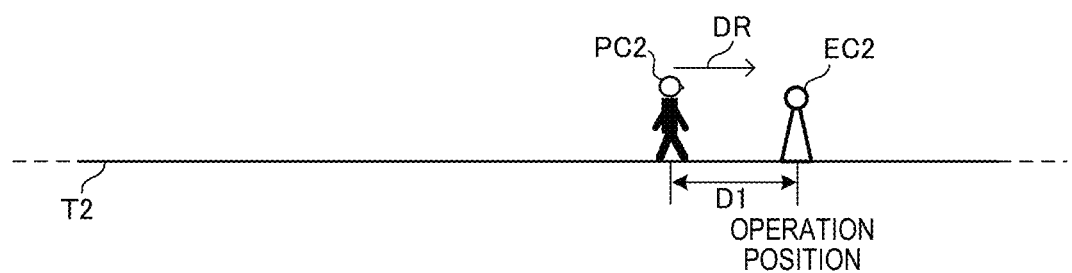

For example, when the party character PC2 moves from the state shown in FIG. 10A to the state shown in FIG. 10B and the operation input for the enemy character EC2 is evaluated as "EXCELLENT" or "GOOD", the party character PC2 attacks the enemy character EC2. Thus, the enemy character EC2 disappears.

Figure 10C:
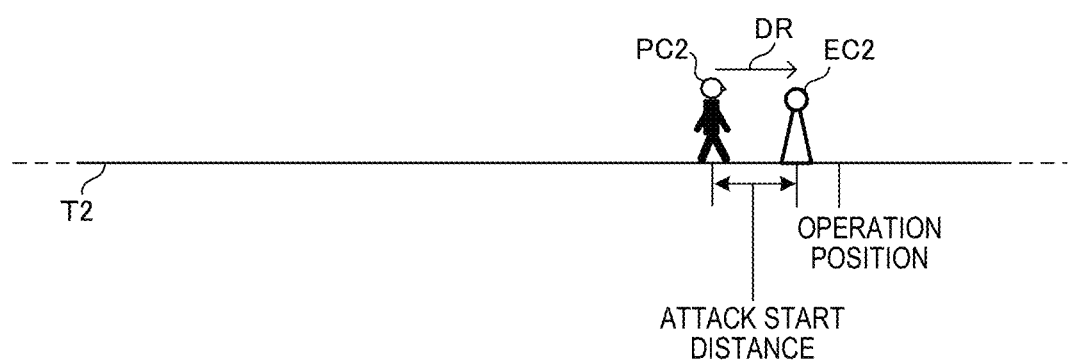

When the operation input is evaluated as "MISS" or when the operation input is not executed, the enemy character EC is not attacked by the party character PC. Therefore, the movement of the party character PC causes the enemy character EC to approach the party character PC. For example, the state changes from the state shown in FIG. 10B to the state shown in FIG. 10C. As illustrated in FIG. 10C, when the distance between the enemy character EC and the party character PC becomes the attack start distance, the enemy character EC starts attacking the party character PC. The enemy character EC attacks the party character PC existing on the same movement path T.

Figure 11C:
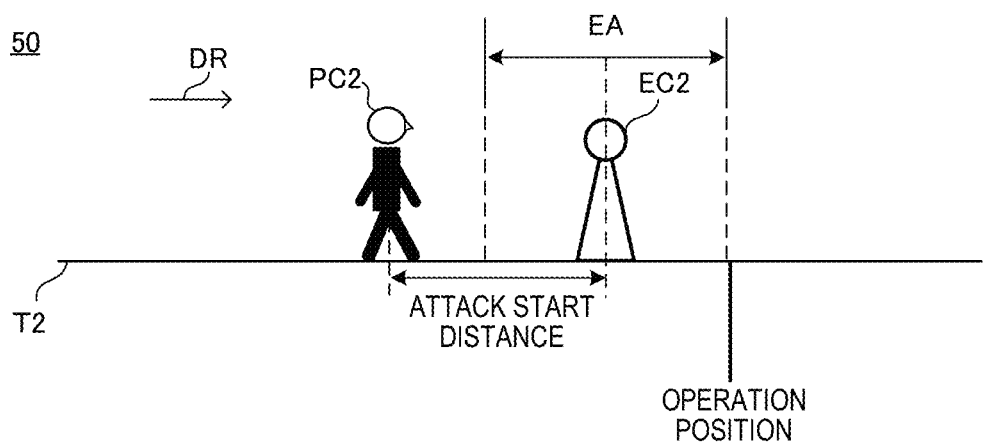

The above-described attack start distance may be set at least as long as the operation position exceeds the evaluation range (evaluation period) EA of the enemy character EC. That is, it is the distance at which the playback position has elapsed the evaluation period. For example, as shown in FIG. 11C, when the operation position exceeds the evaluation range EA of the enemy character EC2, the attack start distance is reached and the enemy character EC2 attacks the party character PC2. When each of the party characters PC1 to PC3 is attacked by the enemy character EC, the current value of the vitality of the party character PC2 is decreased by a predetermined value as described above. Note that the enemy character EC disappears after attacking the party character PC (is hidden).

Next, the auxiliary character SC will be described. When the appearance condition is satisfied, the auxiliary character SC appears in the game space 50 as shown in FIG. 7. The appearance condition is that the lottery has been won. Any probability may be adopted as the winning probability.

The auxiliary character SC executes three auxiliary operations according to the satisfaction of the activation condition. The first auxiliary operation is an operation of defeating the enemy character EC whose evaluation period has elapsed. Specifically, this is an operation in which the auxiliary character SC attacks the enemy character EC and to make the enemy character EC become unable to fight and disappear. For example, an operation of activating a magic that makes the enemy character EC become unable to fight by a remote attack corresponds to the first auxiliary operation. The auxiliary character SC executes a first auxiliary operation before the enemy character EC attacks and damages the party character PC. Therefore, the current value of the vitality does not decrease due to the attack of the enemy character EC. That is, the amount by which the current value of the vitality is decreased by the attack of the enemy character EC is reduced.

The second auxiliary operation is an operation to recover the current value of the vitality of the party character PC2. Specifically, this is an operation of adding a predetermined recovery value to the current value of the vitality of the party character PC2. For example, an operation of activating a magic to recover vitality corresponds to the second auxiliary operation. Note that the recovery value may be included in the game data.

The third auxiliary operation is an operation to restart (continue) the game play when the current value of the vitality reaches 0 (limit value) and the game play ends prematurely. For example, an operation of activating a magic that revives the party character PC2 from the inability to fight corresponds to a third auxiliary operation. By the third auxiliary operation, the party character PC2 is recovered from an unable-to-fight state to the normal state, and the game play is restarted. Thus, the playback of the music is restarted from the position where the playback is interrupted, and the current value of the vitality is also recovered by a constant amount from 0 (for example, a return value which is a half of the maximum value is set to the current value).

Further, the activation condition of each auxiliary operation is, for example, a case where a lottery is won. In the example of the present embodiment, a predetermined winning probability is set for each auxiliary operation. Then, a lottery is executed at a timing at which the auxiliary operation is to be executed. For example, in the first auxiliary operation, a lottery is executed when an enemy character EC that has started an attack occurs. Then, when a win is made, a first auxiliary operation is executed. In the second auxiliary operation, a lottery is executed when the current value of the vitality is decreasing (changing) from the initial value. Then, when a win is made, a second auxiliary operation is executed. In the third auxiliary operation, the lottery is executed when the current value of the vitality of the party character PC2 reaches 0 (limit value) and the game play ends. Then, when a win is made, a third auxiliary operation is executed. In addition, each winning probability is included in the game data. Further, this case may not be the activation condition.

In the example of the present embodiment, the operation position is not displayed on the game image. The user executes an operation input while visually checking the enemy character EC and the timing guide TG.

FIGS. 12A to 12D are diagrams illustrating an example of the operation of the timing guide TG The timing guide TG is displayed superimposed on each enemy character EC that has appeared in the game space 50. The timing guide TG is a guide marker that guides the operation timing for the enemy character EC, by notifying the user of the positional relationship between the enemy character EC and the operation position according to a change in form.

Figure 12A:
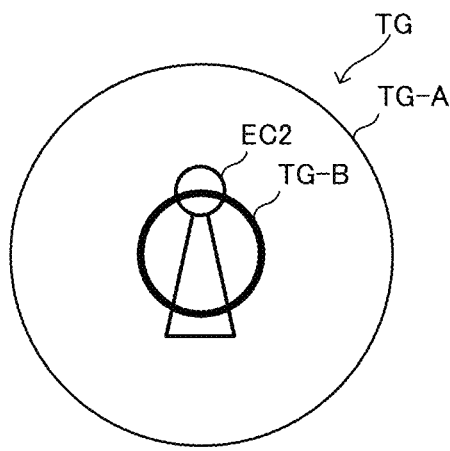
FIGS. 12A, 12B, 12C and 12D are diagrams showing an example of the operation of a guide marker corresponding to at least one of the embodiments of the present invention.
Figure 12B:
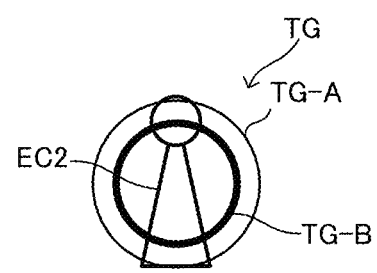

The timing guide TG appears at a timing when the distance between the enemy character EC and the operation position becomes a predetermined value (for example, ½ measure). For example, a timing guide TG as shown in FIG. 12A appears. The timing guide TG includes a ring TG-A and a ring TG-B. The diameter of the ring TG-A decreases in the order shown in FIGS. 12A to 12D. The size of the ring TG-B does not change.

Figure 12C:
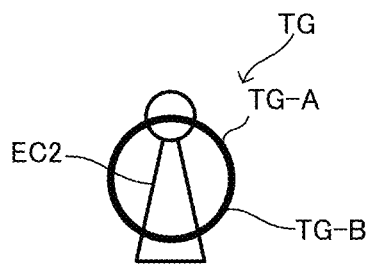
Figure 12D:
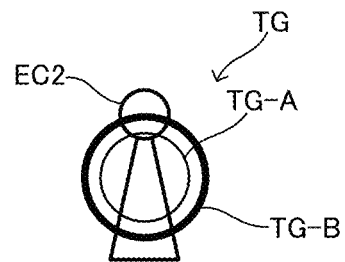

As shown in FIG. 12C, the operation timing for the enemy character EC2 is when the ring TG-A and the ring TG-B overlap each other. That is, FIG. 12C shows that the enemy character EC2 overlaps the operation position. Note that the timing guide TG disappears, when there is a user operation input or when the enemy character EC disappears.

Figure 13:
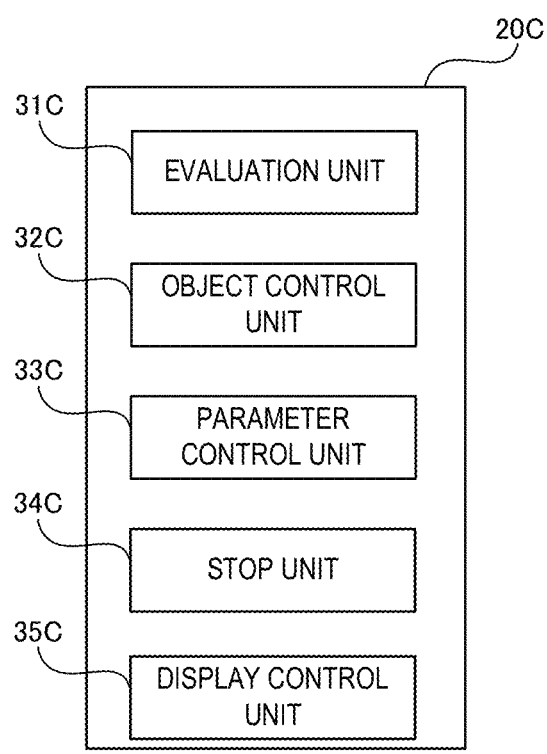
FIG. 13 is a block diagram showing a configuration of a terminal device corresponding to at least one of embodiments of the present invention.

FIG. 13 is a block diagram illustrating a configuration of a terminal device 20C that is an example of the terminal device 20. In the example of the present embodiment, the terminal device 20C includes at least an evaluation unit 31C, an object control unit 32C, a parameter control unit 33C, a stop unit 34C, and a display control unit 35C.

The evaluation unit 31C evaluates the operation input, based on the operation input timing of the operation unit for the trigger object (the enemy character EC) and the operation timing associated with the data (music data) used for music playback. The operation timing is set in timing data described above. Further, an operation input at an operation timing at which the current playback position belongs to the evaluation period is an evaluation target. As illustrated in FIGS. 11A and 11B, evaluations of "EXCELLENT", "GOOD", and "MISS" are made in ascending order of deviation between the user operation input and the operation timing. In addition, a score corresponding to this evaluation is added to the total score. Even when the button of the game controller to which the user inputs operation is incorrect, the evaluation is "MISS".

As described above, the object control unit 32C disposes the enemy character EC for one measure at the arrangement position, based on the timing data. Then, the object control unit 32C moves the party character PC (operation position) such that the distance between the enemy character and the operation position decreases, based on the operation timing corresponding to each enemy character EC.

The object control unit 32C manages trigger objects (the enemy character EC) disposed in the game space 50 using a management table E as shown in FIG. 14. FIG. 14 is a diagram illustrating an example of the management table E. FIG. 14 is a management table E of the enemy character EC appearing on the movement path T2. FIG. 14 shows a state where two enemy characters EC1, EC2 appear in the game space 50 as shown in FIG. 10A. Since the management tables related to the movement paths T1 and T3 have the same configuration, the description thereof is omitted.

The management table E includes fields of a character ID, and a current position. In the character ID field, identification information of the enemy character EC currently disposed in the game space 50 is set. In the character ID field, a character ID included in the corresponding operation timing is set. The current position is associated with the character ID. In the current position field, the current position of the enemy character EC or the like is set. For example, coordinate information (world coordinates of the game space 50) on the movement path T is set.

Further, the object control unit 32C causes the enemy character EC to disappear from the game space 50 by deleting the information of the enemy character EC attacked by the party character PC from the management table E. Further, when the enemy character EC approaches the party character PC to the attack starting distance, the object control unit 32C causes the enemy character EC to attack.

Further, the object control unit 32C manages the party characters PC disposed in the game space 50 by using a management table P as shown in FIG. 15. FIG. 15 is a diagram illustrating an example of the management table P. FIG. 15 shows a state in which three party characters PC1 to PC3 and an auxiliary character SC appear in the game space 50, as shown in FIG. 7. Note that the auxiliary character SC is also included in the party characters constituting the party of the user.

The management table P includes fields of a character ID, a current position, a lane number, and an HP. In the character ID field, identification information of the party character PC or the like is set. The current position, lane number, and HP are associated with each character ID. Character IDs: P001 to P003 indicate party characters PC1 to PC3. Character ID: SC01 indicates the auxiliary character SC.

In the current position field, the current position of the party character PC or the like is set. For example, coordinate information (world coordinates of the game space 50) on the movement path T is set. In the lane number field, information on the movement path T of the party character PC is set. For example, lane numbers: 01 to 03 correspond to movement paths T1 to T3. In the case of the auxiliary character SC, no lane number is set.

In the HP field, the current value of the vitality of the party character PC2 is set. Note that the maximum value of the vitality of the party character PC2 is set as an initial value. The maximum value is included in the game data. In the case of the party characters PC1, PC3 and the auxiliary character SC, no vitality is set. The management tables E and P may be stored in the storage unit of the terminal device 20C.

Further, the object control unit 32C causes the auxiliary character SC to appear when the appearance condition is satisfied. Then, when the activation condition is satisfied, the object control unit 32B causes the appearing auxiliary character SC to execute an auxiliary operation.

Further, the object control unit 32C controls the movement of the party character PC and the attacking action. That is, the object control unit 32C moves the party character PC on the movement path T at a constant speed, as described above. Further, the party character PC is caused to execute an attacking action, when the user's operation input has an appropriate evaluation. Further, the object control unit 32C executes success determination as to the attack of the party character PC and the attack of the enemy character EC. The success determination may be executed by, for example, determining a collision between characters. Note that, in the example of the present embodiment, the attack by each character is controlled so as to always succeed.

The parameter control unit 33C decreases or increases the value of a predetermined parameter by a predetermined value (damage value), at least when an operation input for the trigger object is not executed. In the example of the present embodiment, when any of the three party characters PC1 to PC3 is attacked, the current value of the vitality of the party character PC2 is decreased by a predetermined value. That is, in the example of the present embodiment, when the operation input for the trigger object is not executed, and when the operation input for the trigger object is evaluated as "MISS", the current value of the vitality (predetermined parameter) of the party character PC2 decreases.

In addition, by executing the second auxiliary operation, the parameter control unit 33C adds the recovery value to the current value of the vitality of the party character PC2 and recovers the party character PC2.

When the value of the predetermined parameter reaches the limit value, the stop unit 34C interrupts the playback of the music, and stops the progress of the game. In the example of the present embodiment, when the current value of the vitality of the party character PC2 reaches the limit value: 0, the stop unit 34C interrupts the playback of the music and stops the progress of the game. The stop unit 34C restarts the progress of the interrupted game by executing the third auxiliary operation. When restarting, the parameter control unit 33C sets the current value of the vitality of the party character PC2 to the return value. The return value may be, for example, a half of the maximum value. Note that the damage value, the recovery value, and the return value may be included in the game data.

The display control unit 35C generates a game image as shown in FIG. 7 according to the operation result of each object by the object control unit 32C and displays the game image on the display unit.

Next, the operation of the game system 100 (system 100) of this embodiment will be described.

Figure 16:
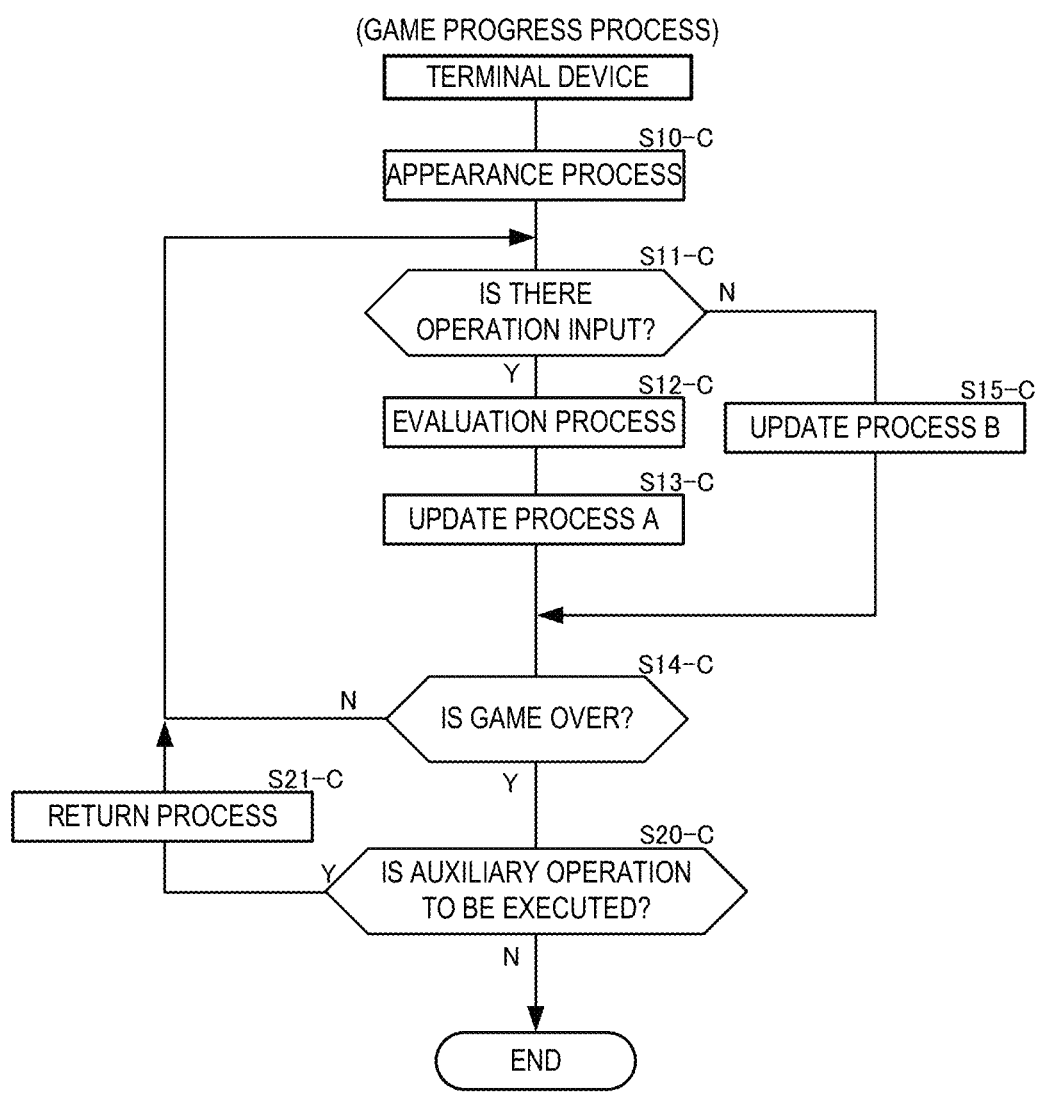
FIG. 16 is a flowchart showing an example of a game progress process corresponding to at least one of the embodiments of the present invention.

FIG. 16 is a flowchart illustrating an example of a game progress process executed by the system 100. In the game progress process, a process for progressing the game, such as a process for controlling the movement of the trigger object (enemy object EC), an evaluation process, and a process for controlling the operation of the auxiliary object (auxiliary character SC), is executed. Hereinafter, a case where the terminal device 20C executes the game progress process will be described as an example. FIG. 16 mainly shows a process for controlling the movement of the trigger object, an evaluation process, and a process for controlling the operation of the auxiliary object, and the description of the other game progress processes is partially omitted. The flowchart showing the operation of the server device is omitted from the viewpoint of avoiding redundant explanation.

The game progress process of the example of the present embodiment is executed, for example, when there is an operation input for starting a game (music playback) by the user.

Note that the terminal device 20C generates a game image including an image of the game space in which the trigger object appears, at a predetermined timing (for example, every ⅟60 seconds) in accordance with the processing result of the game progress process, during the execution of the game progress process, and displays the game image on a display screen.

The terminal device 20C executes an appearance process (step S10-C). In the appearance process, a process for causing the auxiliary character SC to appear is executed. Specifically, as described above, the establishment of the appearance conditions by the lottery is determined. When the appearance condition is satisfied, the auxiliary character SC is caused to appear in the game space. Specifically, information of the auxiliary character is set in the management table P.

Thereafter, the terminal device 20C determines whether or not there is an operation input (step S11-C). As described above, it is determined whether or not there is an operation input in the evaluation period corresponding to one trigger object. The terminal device 20C may determine whether or not there is an operation input, based on the operation information received from the operation unit. When there is no operation input (step S11-C: NO), the terminal device 20C proceeds to the process of step S15-C.

On the other hand, when there is an operation input (step S11-C: YES), the terminal device 20C executes an evaluation process (step S12-C). In the evaluation process, as described above, the user's operation input is evaluated based on the degree of coincidence between the user's operation input and the operation timing, with reference to the timing data.

Next, the terminal device 20C executes an object update process A (step S13-C). In the update process A, the terminal device 20C updates the operation of each object in the game space 50. The terminal device 20C updates the management table E based on each operation timing, and causes the trigger object (enemy character EC) to appear at the arrangement position. Further, the terminal device 20C moves the party character PC toward the enemy character EC or the like such that the enemy character EC reaches the operation position when the operation timing comes (updates the management table P).

Further, in the update process A, the terminal device 20C causes the party character PC to attack the above-described one trigger object (enemy character EC) that has received the operation input, based on the evaluation ("EXCELLENT", "GOOD") for the operation input. Then, the attacked enemy character EC disappears from the game space 50. Specifically, the terminal device 20C deletes the information on the enemy character EC from the management table E.

Further, in the update process A, the enemy character EC which is at a distance equal to or less than the attack start distance is caused to attack the party character SC. Further, the terminal device 20C causes the enemy character EC to disappear after the attack operation. Specifically, the terminal device 20C deletes the information on the enemy character EC from the management table E.

Further, the terminal device 20C controls the operation of the auxiliary character SC appearing in the game space 50. As described above, following the movement of the party character PC, when the activation condition is satisfied, the auxiliary operations (the first auxiliary operation and the second auxiliary operation) are executed.

Further, in the update process A, as described above, the timing guide TG is controlled. Thereafter, the terminal device 20C proceeds to the process of step S14-C.

Returning to the process of step S11-C, when it is determined that there is no operation input, the terminal device 20C executes the object update process B (step S15-C). In the update process B, the same process as the above-described update process A is executed, but the process related to the one trigger object that has received the operation input as in the update process A is not executed. In the update process B, similarly to the update process A, the enemy character EC whose distance is equal to or less than the attack start distance is caused to attack the party character SC.

Further, the terminal device 20C controls the operation of the auxiliary character SC appearing in the game space 50. As described above, the movement of the party character PC is followed, and the auxiliary operation (the first auxiliary operation and the second auxiliary operation) is executed when the activation condition is satisfied.

Note that the processes of steps S10-C to S13-C and S15-C described above are executed for all of the movement paths T1 to T3.

Thereafter, the terminal device 20C determines whether or not the game is over (step S14-C). The terminal device 20C determines that the game is over when the playback of the music is ended. The terminal device 20C also determines that the game is over when the current value of the vitality of the party character PC2 has reached the limit value. When the game is not over (step S14-C: NO), the terminal device 20C returns to the process of step S11-C.

On the other hand, when the game is over (step S14-C: YES), the terminal device 20C determines whether or not to execute an auxiliary operation (third auxiliary operation) to restart the progress of the game (step S20-C). For example, when the current value of the vitality of the party character PC2 has reached 0 (limit value), the game play has ended, and the auxiliary object has appeared, the terminal device 20C determines to execute the auxiliary operation when the activation condition by lottery is satisfied. When it is determined that the auxiliary operation is not to be executed (step S20-C: NO), the terminal device 20C ends the game progress process.

On the other hand, when it is determined that the auxiliary operation is to be executed (step S20-C: YES), the terminal device 20C executes a return process (step S21). In the return process, the auxiliary character SC is caused to execute a third auxiliary operation to restart the progress of the game. Thereafter, the terminal device 20C proceeds to the process of step S11-C.

As described above, as one aspect of the third embodiment, the terminal device 20C is configured to include the evaluation unit 31C, the object control unit 32C, the parameter control unit 33C, the stop unit 34C, and the display control unit 35C. When the appearance condition is satisfied, an auxiliary object executing an auxiliary operation appears. Therefore, even a user such as a beginner with a low level of game skill can enjoy playing.

Note that, in the example of the above-described embodiment, the auxiliary character appears when the appearance condition is satisfied. However, when there is a prohibition input by the user, the appearance of the auxiliary character may be prohibited regardless of whether the appearance condition is satisfied. Some users may not want assistance.

Although the auxiliary operation in the example of the above-described embodiment is an operation that does not affect the evaluation, an operation that assists to improve the evaluation of the operation input may be applied as the auxiliary operation. For example, instead of the user's operation input (attack of the party character), the auxiliary character may execute, as the auxiliary operation, an alternative operation which is evaluated as "EXCELLENT". Specifically, in the example of the above-described embodiment, in a state where the enemy character is in the operation position, the auxiliary character attacks the enemy character to disappear. In this case, even if there is a user's operation input, the party character is not made to attack the enemy character. Thus, when the auxiliary character executes the alternative operation, the user can always receive the evaluation of "EXCELLENT". Then, the game score for the evaluation also increases.

In the example of the above-described embodiment, the current value of the vitality of the party character is decreased by a predetermined value by one attack from the enemy character, but the decrease amount may not be constant. For example, the value may be decreased by a value calculated according to the attack power or the like set for each type of enemy character.

In the example of the above-described embodiment, the enemy character disappears by one attack from a party character or the like, but the present invention is not particularly limited to this. For example, the vitality may be set for the enemy character, and the current value of the vitality may be decreased according to the attack power of the party character. In this case, if the enemy character does not become unable to fight by one attack, the position of the enemy character may be moved (backed) away from the party character.

In the example of the above-described embodiment, one auxiliary character appears, but the number of appearances is not particularly limited. For example, the auxiliary character may appear on each movement path. Then, the auxiliary operation may be executed only on the movement path where the auxiliary character appears.

In the example of the above-described embodiment, the activation condition is set for the auxiliary operation, but the activation condition may not be set.

In the example of the above-described embodiment, the trigger object is disposed on the movement path, but it may not be on the movement path. For example, the trigger object may be disposed in the vicinity of the movement path. In this case, the operation position may be on a circumference having a radius of a predetermined distance centered on the party character. Then, it may be determined that the operation timing has arrived when the trigger object disposed in the vicinity of the movement path overlaps the circumference.

In the example of the above-described embodiment, the party character (operation position) moves. However, the trigger object may move. Alternatively, the party character (operation position) and the trigger object may move.

In the example of the above-described embodiment, the appearance condition is determined only once immediately after the start of the game (music playback), but the present invention is not particularly limited to this. For example, the determination may be made periodically every time a predetermined time elapses during the playback of the music.

In the example of the above-described embodiment, when the appearance condition is satisfied, the auxiliary object continuously appears in the game space, but the present invention is not particularly limited to this. For example, a disappearance condition may be provided. The disappearance condition is, for example, that a lottery (an extinction lottery) with a predetermined probability is won. Alternatively, the disappearance condition may be that the number of times of execution of the auxiliary operation has reached a predetermined number. Further, for example, a condition regarding evaluation of a user's operation input may be used as the disappearance condition. Specifically, the user's operation input has obtained evaluations equal to or more than a constant level ("GOOD") consecutively a predetermined number of times or more.

In the example of the above-described embodiment, only one of the three party characters has the vitality parameter, but all of the three party characters may have the vitality. In this case, for example, when the current value of the vitality of one party character reaches the limit value, the play may end on the movement path of the one party character, and the play may continue on the remaining two movement paths.

[Appendix]

The above-described embodiments have been described such that at least the following invention can be carried out by those having ordinary knowledge in the field to which the invention belongs.

[1]

A rhythm game program for causing a computer to implement a function of controlling a progress of a rhythm game by playing a music and displaying a trigger object on a display unit, causing the computer to implement:

an evaluation function of evaluating an operation input of an operation unit, based on a timing of the operation input for the trigger object and an operation timing associated with data used for playing the music; and an object control function of moving at least one of the trigger object and the operation position such that a distance between the trigger object and the operation position decreases, based on the operation timing corresponding to the trigger object, wherein the object control function implements a function of causing an auxiliary object to appear when an appearance condition is satisfied, and causing the auxiliary object to execute an auxiliary operation to assist a user in a progress of a game.

[2]

The rhythm game program according to [1], causing the computer to further execute a parameter control function of decreasing or increasing a value of a predetermined parameter by a predetermined value at least when no operation input is executed for the trigger object, and a stop function of interrupting playback of the music and stopping the progress of the game when the value of the predetermined parameter reaches a limit value, wherein the object control function implements, as the auxiliary operation, a function of causing the auxiliary object to execute at least one of an operation of reducing an amount of decreasing or increasing the value of the predetermined parameter, an operation of recovering the value of the predetermined parameter, and an operation of restarting the stopped progress of the game.

[3]

The rhythm game program according to [2], wherein the predetermined parameter is a vitality associated with an operation object operated by the user, and wherein the object control function implements a function of causing the operation object to execute an attack against the trigger object for which the operation input is executed, based on an evaluation of the operation input, and a function of causing the trigger object to execute an attack against the operation object when at least the operation input for the trigger object is not executed, and wherein the parameter control function implements a function of decreasing a value of the vitality by a predetermined value when the attack by the trigger object is received.

[4]

The rhythm game program according to [3], wherein the object control function implements a function of, when at least the operation input for the trigger object is not executed, before an attack against the operation object is executed, causing the auxiliary object to execute an attack against the trigger object to disappear, as the operation of reducing the amount of decreasing the value of the predetermined parameter.

[5]

The rhythm game program according to any one of [1] to [4], wherein the object control function implements a function of causing the auxiliary object to execute the auxiliary operation, when an activation condition is satisfied.

[6]

The rhythm game program according to [5], wherein the activation condition is winning by lottery.

[7]

The rhythm game program according to [1], wherein the appearance condition is a winning by lottery.

[8]

The rhythm game program according to [1], wherein the object control function implements a function that does not cause the auxiliary object to appear, when there is a prohibition operation input of the operation unit by the user.

[9]

A server device in which the rhythm game program according to any one of [1] to [8] is installed.

[10]

A terminal program for causing a game terminal device to implement a function of displaying a game screen on a display screen of a display device and controlling the progress of a rhythm game, wherein the game terminal device implements a connection function of connecting to the server device according to [9] via a communication network.

[11]

A rhythm game program for causing a server device connected to a game terminal device that executes a rhythm game by playing a music and displaying a trigger object on a display unit, through a communication network to control a progress of the rhythm game, causing the server device to implement:

an evaluation function of evaluating an operation input of an operation unit, based on a timing of the operation input for the trigger object and an operation timing associated with data used for playing the music; and an object control function of moving at least one of the trigger object and the operation position such that a distance between the trigger object and the operation position decreases, based on the operation timing corresponding to the trigger object, wherein the object control function implements a function of causing an auxiliary object to appear when an appearance condition is satisfied, and causing the auxiliary object to execute an auxiliary operation to assist a user in a progress of a game.

[12]

The rhythm game program according to [11], causing the server device to further implement, at least when no operation input is executed for the trigger object, a parameter control function for decreasing or increasing the value of a predetermined parameter by a predetermined value, and when the value of the predetermined parameter reaches a limit value, a stop function for interrupting playback of music and stopping the progress of the game, wherein the object control function implements, as the auxiliary operation, a function of causing the auxiliary object to execute at least one of an operation of reducing the amount of decreasing or increasing the value of a predetermined parameter, an operation of recovering the value of the predetermined parameter, and an operation of restarting the progress of the stopped game.

[13]

The rhythm game program according to [12], wherein the predetermined parameter is a vitality associated with the operation object operated by the user, and wherein the object control function implements a function of causing the operation object to execute an attack against the trigger object for which the operation input is executed, based on an evaluation of the operation input, and a function of causing the trigger object to execute an attack against the operation object when at least the operation input for the trigger object is not executed, and wherein the parameter control function implements a function of reducing a value of the vitality by a predetermined value when the attack by the trigger object is received.

[14]

The rhythm game program according to [13], wherein the object control function implements a function of, when at least the operation input for the trigger object is not executed, before an attack against the operation object is executed, causing the auxiliary object to make an attack against the trigger object to disappear, as an operation of reducing the amount of decreasing the value of the predetermined parameter.

[15]

The rhythm game program according to any one of [11] to [14], wherein the object control function implements a function of causing the auxiliary object to execute the auxiliary operation, when an activation condition is satisfied.

[16]

The rhythm game program according to [15], wherein the activation condition is winning by lottery.

[17]

The rhythm game program according to [11], wherein the appearance condition is a winning by lottery.

[18]

The rhythm game program according to [11], wherein the object control function implements a function that does not cause the auxiliary object to appear, when there is an operation input for prohibiting the operation unit by the user.

[19]

A game system including a game terminal device which executes a rhythm game by playing a music and displaying a trigger object on a display unit, and a server device connected to the game terminal device through a communication network, the game system realizing:

an evaluation controller configured to evaluate an operation input of an operation unit, based on a timing of the operation input for the trigger object and an operation timing associated with data used for playing the music; and an object controller configured to move at least one of the trigger object and the operation position such that a distance between the trigger object and the operation position decreases, based on the operation timing corresponding to the trigger object, wherein the object controller causes an auxiliary object to appear when an appearance condition is satisfied, and causes the auxiliary object to execute an auxiliary operation to assist a user in a progress of a game.

[20]

The game system according to [19], causing the game system to further implement a parameter controller configured to decrease or increase a value of a predetermined parameter by a predetermined value when at least no operation input is executed for the trigger object, and a stopper configured to interrupt playback of the music and stop the progress of the game when the value of the predetermined parameter reaches a limit value, wherein the object controller, as the auxiliary operation, causes the auxiliary object to execute at least one of an operation of reducing an amount of decreasing or increasing the value of the predetermined parameter, an operation of recovering the value of the predetermined parameter, and an operation of restarting the stopped progress of the game.

[21]

The game system according to [20], wherein the predetermined parameter is a vitality associated with an operation object operated by the user, and wherein the object controller causes the operation object to execute an attack against the trigger object for which the operation input is executed, based on an evaluation of the operation input, and causes the trigger object to execute an attack against the operation object when at least the operation input for the trigger object is not executed, and wherein the parameter controller decreases a value of the vitality by a predetermined value when the attack by the trigger object is received.

[22]

The game system according to [21], wherein the object controller, when at least the operation input for the trigger object is not executed, before an attack against the operation object is executed, causes the auxiliary object to execute an attack against the trigger object to disappear, as the operation of reducing the amount of decreasing the value of the predetermined parameter.

[23]

The game system according to any one of [19] to [22], wherein the object controller causes the auxiliary object to execute the auxiliary operation, when an activation condition is satisfied.

[24]

The game system according to [23], wherein the activation condition is winning by lottery.

[25]

The game system according to [19], wherein the appearance condition is a winning by lottery.

[26]

The game system according to [19], wherein the object controller does not cause the auxiliary object to appear, when there is a prohibition operation input of the operation unit by the user.

[27]

A game terminal device that controls a progress of a rhythm game by playing a music and displaying a trigger object on a display unit, the device realizing:

an evaluation controller configured to evaluate an operation input of an operation unit, based on a timing of the operation input for the trigger object and an operation timing associated with data used for playing the music; and an object controller configured to move at least one of the trigger object and the operation position such that a distance between the trigger object and the operation position decreases, based on the operation timing corresponding to the trigger object, wherein the object controller causes an auxiliary object to appear when an appearance condition is satisfied, and causes the auxiliary object to execute an auxiliary operation to assist a user in a progress of a game.

[28]

A rhythm game progress control method for causing a computer to control a progress of a rhythm game by playing a music on a computer and displaying a trigger object on a display unit, the method comprising:

an evaluation step of evaluating an operation input of an operation unit, based on a timing of the operation input for the trigger object and an operation timing associated with data used for playing the music; and an object control step of moving at least one of the trigger object and the operation position such that a distance between the trigger object and the operation position decreases, based on the operation timing corresponding to the trigger object, wherein the object control step causes an auxiliary object to appear when an appearance condition is satisfied, and causes the auxiliary object to execute an auxiliary operation to assist a user in a progress of a game.

According to one of the embodiments of the present invention, it is useful to provide a rhythm game in which even a user such as a beginner with a low level of game skill can enjoy playing.

What is claimed is:

1. A non-transitory computer readable medium storing a rhythm game program for causing a computer to execute functions of controlling a progress of a rhythm game, the functions comprising:
   playing a music;
   displaying a game image including an image of a game space including a trigger object on a display;
   evaluating an operation input of an operation unit, based on a timing of the operation input for the trigger object and an operation timing associated with data used for playing the music;
   moving at least one of the trigger object and an operation position such that a distance between the trigger object and the operation position decreases, based on the operation timing corresponding to the trigger object;
   causing an auxiliary character to appear in the game space when an appearance condition is satisfied; and
   causing the auxiliary character to execute an auxiliary operation to assist a user in a progress of a game.

2. The non-transitory computer readable medium according to claim 1, wherein the functions further comprise:
   decreasing or increasing a value of a predetermined parameter by a predetermined value when at least no operation input is executed for the trigger object; and
   interrupting playback of the music and stopping the progress of the game when the value of the predetermined parameter reaches a limit value, and
   wherein the auxiliary operation comprises at least one of:
   an operation of reducing an amount of decreasing or increasing the value of the predetermined parameter,
   an operation of recovering the value of the predetermined parameter; or
   an operation of restarting the stopped progress of the game.

3. The non-transitory computer readable medium according to claim 2,
   wherein the predetermined parameter is a vitality associated with an operation object operated by the user, and
   wherein the functions further comprise:
       causing the operation object to execute an attack against the trigger object for which the operation input is executed, based on an evaluation of the operation input; and
       causing the trigger object to execute an attack against the operation object when at least the operation input for the trigger object is not executed, and
   wherein decreasing or increasing the value of the predetermined parameter comprises decreasing a value of the vitality by a predetermined value when the attack by the trigger object is received.

4. The non-transitory computer readable medium according to claim 3,
   wherein the function further comprise causing the auxiliary character to execute an attack against the trigger object to disappear before an attack against the operation object is executed in order to reduce the amount of decreasing the value of the predetermined parameter, when at least the operation input for the trigger object is not executed.

5. The non-transitory computer readable medium according to claim 1,
   wherein the function further comprise causing the auxiliary character to execute the auxiliary operation, when an activation condition is satisfied.

6. The non-transitory computer readable medium according to claim 5,
   wherein the activation condition is winning by lottery.

7. The non-transitory computer readable medium according to claim 1,
   wherein the appearance condition is a winning by lottery.

8. The non-transitory computer readable medium according to claim 1,
   wherein the function further comprise prohibiting the auxiliary character to appear, when the operation unit receives a prohibition operation input by the user.

9. A non-transitory computer readable medium storing a rhythm game program for causing a server device connected to a game terminal device configured to execute a rhythm game by playing a music and displaying a trigger object on a display by a communication network to control a progress of the rhythm game, the program causing the server device to execute functions comprising:
   evaluating an operation input of an operation unit of the game terminal device, based on a timing of the operation input for the trigger object and an operation timing associated with data used for playing the music;
   moving at least one of the trigger object and an operation position to decrease a distance between the trigger object and the operation position decreases, based on the operation timing corresponding to the trigger object;
   causing an auxiliary character to appear when an appearance condition is satisfied; and
   causing the auxiliary character to execute an auxiliary operation to assist a user in a progress of a game.

10. A game system comprising:
    a game terminal device comprising
        a display;
        an operation unit configured to receive an operation input;
        a processor configured to play a music and further configured to display a game image including an image of a game space including a trigger object on the display; and
    a server device which is connected to the game terminal device by a communication network,
    wherein the game system is configured to evaluate the operation input, based on a timing of the operation input for the trigger object and an operation timing associated with data used for playing the music, and further configured to move at least one of the trigger object and an operation position such that a distance between the trigger object and the operation position decreases, based on the operation timing corresponding to the trigger object, and
    wherein the game system is further configured to cause an auxiliary character to appear in the game space when an appearance condition is satisfied, and to cause the auxiliary character to execute an auxiliary operation to assist a user in a progress of a game.

\* \* \* \* \*